(12) United States Patent
O'Brien, III et al.

(10) Patent No.: US 9,280,427 B1
(45) Date of Patent: Mar. 8, 2016

(54) STORAGE SYSTEM PERFORMANCE RECOVERY AFTER STORAGE PROCESSOR FAILURE

(71) Applicant: EMC Corporation, Hopkinton, MA (US)

(72) Inventors: Walter A. O'Brien, III, Westborough, MA (US); Steven D. Sardella, North Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 150 days.

(21) Appl. No.: 14/230,596

(22) Filed: Mar. 31, 2014

(51) Int. Cl.
*G06F 11/00* (2006.01)
*G06F 11/16* (2006.01)
*G06F 11/20* (2006.01)

(52) U.S. Cl.
CPC ........ *G06F 11/1666* (2013.01); *G06F 11/2069* (2013.01); *G06F 11/2058* (2013.01)

(58) Field of Classification Search
CPC .............. G06F 3/0619; G06F 11/1666; G06F 11/2056; G06F 11/2058; G06F 11/2069
See application file for complete search history.

(56) References Cited

U.S. PATENT DOCUMENTS

| 6,330,642 | B1* | 12/2001 | Carteau | G06F 11/2092 711/114 |
| 6,996,690 | B2* | 2/2006 | Nakamura | G06F 11/1666 711/161 |
| 7,694,093 | B2* | 4/2010 | Shaw | G06F 11/1658 711/105 |
| 8,380,668 | B2* | 2/2013 | Bk | G06F 11/2089 707/626 |
| 8,688,934 | B1* | 4/2014 | Sardella | G06F 11/1666 711/118 |
| 8,904,231 | B2* | 12/2014 | Coatney | G06F 11/2023 714/4.11 |

* cited by examiner

*Primary Examiner* — Joseph Kudirka
(74) *Attorney, Agent, or Firm* — Proskauer Rose LLP (57) ABSTRACT

A method performed by a storage system includes a first storage processor performing input/output (IO) requests on a first one or more logical units, and a second storage processor performing IO requests on a second one or more logical units. If the first storage processor fails, the third storage processor performs the IO requests on the first one or more logical units. If the second storage processor fails, the fourth storage processor performing the IO requests on the second one or more logical units.

20 Claims, 5 Drawing Sheets

STORAGE SYSTEM PERFORMANCE RECOVERY AFTER STORAGE PROCESSOR FAILURE

FIELD OF THE TECHNOLOGY

The present technology relates generally to storage systems including storage processors and, more specifically, to storage systems and methods for recovering performance after storage processor failure.

BACKGROUND

Data storage systems can fall into a plurality of categories, such as Network Attached Storage (NAS) and Storage Area Networks (SAN). A NAS system can be a stand-alone, network-accessible, storage device that can provide file-level access to electronic data. A SAN array can be a dedicated storage system that can connect numerous storage resources to one or many hosts. A SAN can provide block-level access to electronic data through one or more protocols, e.g., (SCSI-based protocols such as Fiber Channel or iSCSI), which can be used by a connected host to provide a file system.

Storage systems can be employed that include two storage processors and one or more storage devices. Examples of such storage devices include disk storage arrays and network storage arrays. From the perspective of a host that issues input/output (IO) requests to the storage processors to read, write, copy, and/or allocate data storage on the storage devices, the storage devices appear accessible from either storage processor. Using two active storage processors to perform IO requests can improve the overall performance of the storage system.

SUMMARY

The performance of storage systems that use two active storage processors can become degraded when one of the storage processors fails, leaving one storage processor active and servicing IO requests. In some storage systems, the remaining active storage processor can take over processing all of the received IO requests. As a result, there can be a decrease in the speed at which IO requests are processed by the storage system. Additionally, by having a single active storage processor, the storage system can lack the necessary redundancy to be highly-available. For example, the storage system can become unavailable if the remaining active storage processor fails. Therefore there is a need for storage systems that can recover performance and availability after a storage processor failure.

In one aspect, there is a method performed by a storage system including a first storage processor enclosure including a first storage processor including a first cache, and a second storage processor including a second cache, the second storage processor connected to the first storage processor by a first cache mirroring connection; a second storage processor enclosure including a third storage processor including a third cache; and a fourth storage processor including a fourth cache, the fourth storage processor connected to the third storage processor by a second cache mirroring connection; wherein the first storage processor is connected to the fourth storage processor by a third cache mirroring connection, and the second storage processor is connected to the third storage processor by a fourth cache mirroring connection; and a disk enclosure including a plurality of disk units forming a plurality of logical units, wherein the disk enclosure is connected to the first storage processor, the second storage processor, the third storage processor, and the fourth storage processor. The method includes performing, by the first storage processor, IO requests on a first one or more logical units of the plurality of logical units. The method includes performing, by the second storage processor, IO requests on a second one or more logical units of the plurality of logical units. The method includes mirroring, by the first storage processor and the second storage processor, the first cache and the second cache via the first cache mirroring connection. The method includes, if the first storage processor fails, performing, by the third storage processor, the IO requests on the first one or more logical units, and mirroring, by the second storage processor and the third storage processor, the second cache and the third cache via the fourth cache mirroring connection. The method includes, if the second storage processor fails, performing, by the fourth storage processor, the IO requests on the second one or more logical units, and mirroring, by the first storage processor and the fourth storage processor, the first cache and the fourth cache via the third cache mirroring connection.

In some embodiments, the method can include, if the first storage processor fails and the second storage processor fails: performing, by the third storage processor, the IO requests on the first one or more logical units; performing, by the fourth storage processor, the IO requests on the second one or more logical units; and mirroring, by the third storage processor and the fourth storage processor, the third cache and the fourth cache via the second cache mirroring connection.

In some embodiments, the storage system further includes a first service connection connecting the first storage processor and the second storage processor; a second service connection connecting the third storage processor and the fourth storage processor; and a third service connection connecting the first storage processor enclosure and the second storage processor enclosure and the method can include monitoring for failure, by at least one of the first storage processor, the second storage processor, the third storage processor, and the fourth storage processor, via at least one of the first service connection, the second service connection, and the third service connection, at least one of the first storage processor, the second storage processor, the third storage processor, and the fourth storage processor.

In some embodiments, the method can include, if the first storage processor fails, copying the second cache to the third cache before the third storage processor performs the IO requests on the first one or more logical units. In some embodiments, the method can include, if the second storage processor fails, copying the first cache to the fourth cache before the fourth storage processor performs the IO requests on the second one or more logical units. In some embodiments, the method can include mirroring the first cache, the second cache, the third cache, and the fourth cache via one or more of the first cache mirroring connection, the second cache mirroring connection, the third cache mirroring connection, and the fourth cache mirroring connection.

In some embodiments, mirroring the first cache, the second cache, the third cache, and the fourth cache via one or more of the first cache mirroring connection, the second cache mirroring connection, the third cache mirroring connection, and the fourth cache mirroring connection includes broadcasting cache data via one or more of the first cache mirroring connection, the second cache mirroring connection, the third cache mirroring connection, and the fourth cache mirroring connection.

In another aspect, there is a storage system. The storage system includes a first storage processor enclosure including a first storage processor including a first cache; and a second storage processor including a second cache, the second storage processor connected to the first storage processor by a first cache mirroring connection. The storage system includes a second storage processor enclosure including a third storage processor including a third cache; and a fourth storage processor including a fourth cache, the fourth storage processor connected to the third storage processor by a second cache mirroring connection. The first storage processor is connected to the fourth storage processor by a third cache mirroring connection, and the second storage processor is connected to the third storage processor by a fourth cache mirroring connection. The storage system includes a disk enclosure including a plurality of disk units forming a plurality of logical units, wherein the disk enclosure is connected to the first storage processor, the second storage processor, the third storage processor, and the fourth storage processor. The first storage processor is configured to perform IO requests on a first one or more logical units of the plurality of logical units and the second storage processor is configured to perform IO requests on a second one or more logical units of the plurality of logical units, and the first storage processor and the second storage processor are configured to maintain the first cache and the second cache in a mirrored relationship via the first cache mirroring connection. If the first storage processor fails, the storage system is configured to cause the third storage processor to perform the IO requests on the first one or more logical units, and cause the second storage processor and the third storage processor to maintain the second cache and the third cache in a mirrored relationship via the fourth cache mirroring connection. If the second storage processor fails, the storage system is configured to cause the fourth storage processor to perform the IO requests on the second one or more logical units, and cause the first storage processor and the fourth storage processor to maintain the first cache and the fourth cache in a mirrored relationship via the third cache mirroring connection.

In some embodiments, the storage system is further configured, if the first storage processor fails and the second storage processor fails, to cause the third storage processor to perform the IO requests on the first one or more logical units, the fourth storage processor to perform the IO requests on the second one or more logical units, and cause the third storage processor and the fourth storage processor to maintain the third cache and the fourth cache in a mirrored relationship via the second cache mirroring connection.

In some embodiments, the storage system includes a first service connection connecting the first storage processor and the second storage processor. In some embodiments, the storage system includes a second service connection connecting the third storage processor and the fourth storage processor. In some embodiments, the storage system includes a third service connection connecting the first storage processor enclosure and the second storage processor enclosure. In some embodiments, at least one of the first storage processor, the second storage processor, the third storage processor, and the fourth storage processor is configured to monitor for failure at least one of the first storage processor, the second storage processor, the third storage processor, and the fourth storage processor via at least one of the first service connection, the second service connection, and the third service connection.

In some embodiments, if the first storage processor fails, the storage system is further configured to copy the second cache to the third cache before causing the third storage processor to perform the IO requests on the first one or more logical units. In some embodiments, if the second storage processor fails, the storage system is further configured to copy the first cache to the fourth cache before causing the fourth storage processor to perform the IO requests on the second one or more logical units. In some embodiments, the storage system is further configured to maintain the first cache, the second cache, the third cache, and the fourth cache in a mirrored relationship via one or more of the first cache mirroring connection, the second cache mirroring connection, the third cache mirroring connection, and the fourth cache mirroring connection. In some embodiments, the storage system is further configured to broadcast cache data via one or more of the first cache mirroring connection, the second cache mirroring connection, the third cache mirroring connection, and the fourth cache mirroring connection.

In another aspect, there is a storage system. The storage system includes a first storage processor enclosure including a first storage processor including a first cache; and a second storage processor including a second cache, the second storage processor connected to the first storage processor by a first cache mirroring connection. The storage system includes a second storage processor enclosure including a third storage processor including a third cache. The first storage processor, the second storage processor, and the third storage processor are connected by a second cache mirroring connection. The storage system includes a disk enclosure including a plurality of disk units forming a plurality of logical units, wherein the disk enclosure is connected to the first storage processor, the second storage processor, and the third storage processor. The first storage processor is configured to perform IO requests on a first one or more logical units of the plurality of logical units and the second storage processor is configured to perform IO requests on a second one or more logical units of the plurality of logical units, and the first storage processor and the second storage processor are configured to maintain the first cache and the second cache in a mirrored relationship via the first cache mirroring connection. If the first storage processor fails, the storage system is configured to cause the third storage processor to perform the IO requests on the first one or more logical units, and cause the second storage processor and the third storage processor to maintain the second cache and the third cache in a mirrored relationship via the second cache mirroring connection. If the second storage processor fails, the storage system is configured to cause the third storage processor to perform the IO requests on the second one or more logical units, and cause the first storage processor and the third storage processor to maintain the first cache and the third cache in a mirrored relationship via the second cache mirroring connection.

In some embodiments, the storage system includes a first service connection connecting the first storage processor and the second storage processor. In some embodiments, the storage system includes a second service connection connecting the first storage processor enclosure and the second storage processor enclosure. In some embodiments, the third storage processor is configured to monitor for failure at least one of the first storage processor and the second storage processor via at least one of the first service connection and the second service connection.

In some embodiments, if the first storage processor fails, the storage system is further configured to copy the second cache to the third cache before causing the third storage processor to perform the IO requests on the first one or more logical units. In some embodiments, if the second storage processor fails, the storage system is further configured to copy the first cache to the third cache before causing the third storage processor to perform the IO requests on the second one or more logical units. In some embodiments, the storage system is further configured to maintain the first cache, the second cache, and the third cache in a mirrored relationship via one or more of the first cache mirroring connection and the second cache mirroring connection. In some embodiments, the storage system is further configured to broadcast cache data via one or more of the first cache mirroring connection and the second cache mirroring connection.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

A storage system can utilize two active storage processors to service IO requests received from hosts. For example, each active storage processor can perform the necessary processing on storage devices to effectuate the received read, write, copy, etc. IO requests. By allocating processing of the IO requests between the two active storage processors, the storage system's performance (e.g., the number of IO requests handled in a certain amount of time) can be increased. In such storage systems, the failure of one of the active storage processors can reduce the performance and availability of the storage system. Storage processor failure can be caused by hardware failure, software failure, loss of power by the storage processor, or loss of connectivity by the storage system.

The technology described herein facilitates recovery of storage system performance and availability after a storage processor failure. In some embodiments, the technology involves a storage system with two active storage processors connected to storage devices (e.g., each active storage processor can perform IO requests received from hosts for operations to be performed on the storage devices). The storage system can include one or more standby storage processors. The standby storage processors can be configured to operate without processing IO requests. In accordance with embodiments of the technology, when one of the active storage processors fails, the remaining active storage processor takes over performing the IO requests previously performed by the failed storage processor. Beneficially, this can preserve the availability of the storage system, such that IO requests can continue to be serviced. The storage system can then bring up one of the standby storage processors such that the standby storage processor can accept and process IO commands (e.g., transitioning the standby storage processor to an active state). Once the formerly-standby storage processor is operating as an active storage processor, it can process the IO requests previously handled by the failed storage processor. By making the standby storage processor active, the storage system can return to an active-active state (e.g., having two storage processors accepting and processing IO command from hosts).

Exemplary Storage System Environments

Figure 1:
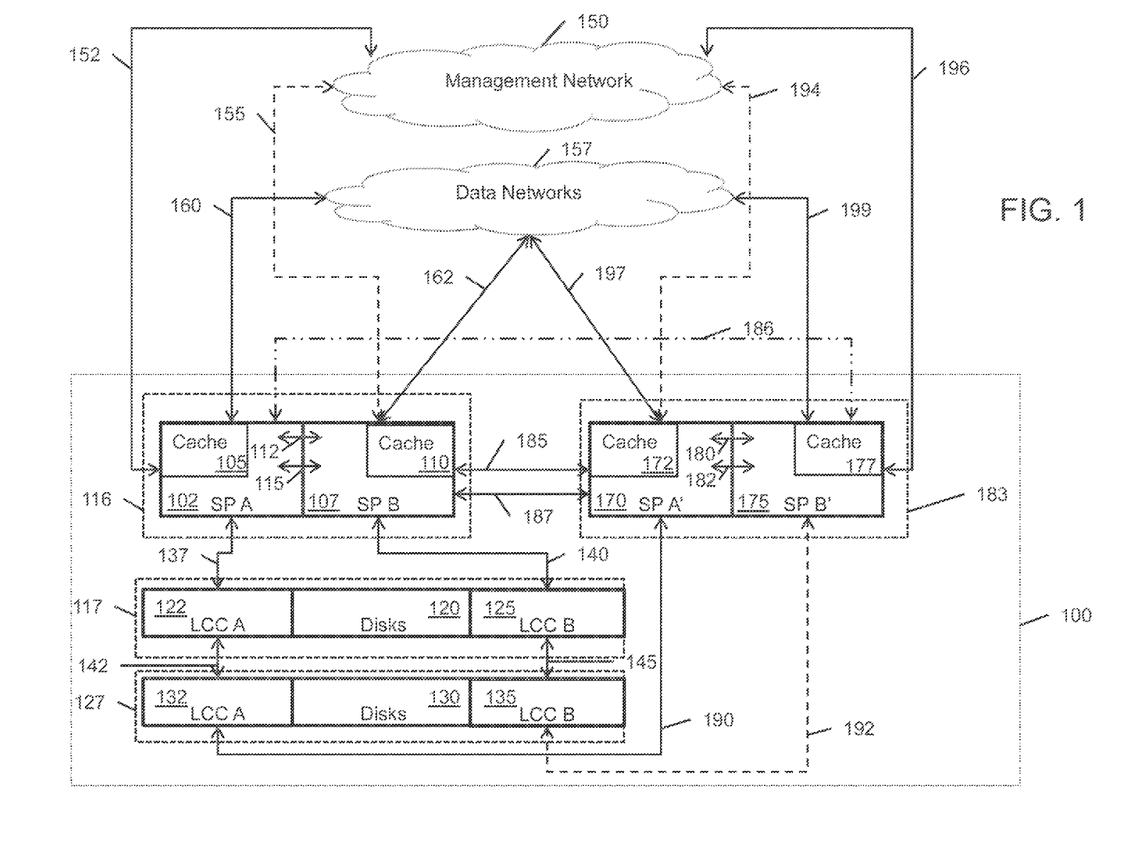
FIG. 1 depicts a storage system, in accordance with the technology.

FIG. 1 depicts storage system 100, in accordance with the technology. Storage system 100 includes storage processor (SP) A 102, which includes cache 105. Storage system 100 includes SP B 107, which includes cache 110. SP A 102 and SP B 107 can be any computing devices, such as servers, blade servers, etc. Cache 105 and cache 110 can be any memory. SP A 102 and SP B 107 are connected by service connection 112 and cache mirroring connection 115. Service connection 112 and cache mirroring connection 115 can each be any type of connection for communicating data between SP A 102 and SP B 107, such as an Ethernet connection, a PCI or PCI express connection, an infiniband connection, etc. In some embodiments, SP A 102 and SP B 107 are contained by storage processor enclosure 116. In some embodiments, service connection 112 and cache mirroring connection 115 can be located on a mid-plane or a back-plane in storage processor enclosure 116, into which SP A 102 and SP B 107 connect.

System 100 includes disk array enclosure 117 and disk array enclosure 127. Disk array enclosure 117 includes disks 120, link control card (LCC) A 122, and LCC B 125. Disk array enclosure 127 includes disks 130, LCC A 132, and LCC B 135. Disks 120 and 130 can be any form of storage, such as magnetic disk drives, flash memory drives, etc. In the illustrated embodiment, SP A 102 is connected to LCC A 122 of disk enclosure 117 by connection 137. SP B 107 is connected to LCC B 125 of disk enclosure 117 by connection 140. LCC A 122 of disk enclosure 117 is connected to LCC A 132 of disk enclosure 127 by connection 142. LCC B 125 of disk enclosure 117 is connected to LCC B 135 of disk enclosure 127 by connection 145. Connections 137, 140, 142, and 145 can be any data connection, such as, e.g., fibre channel.

Storage system 100 can be connected to management network 150. As illustrated, storage processor A 102 and storage processor B 107 are connected to management network 150 by connection 152 and connection 155, respectively. Storage system 100 can be connected to data networks 157. As illustrated, storage processor A 102 and storage processor B 107 are connected to data networks by connection 160 and connection 162, respectively. Connections 152, 155, 160, and 162 can each be any type of connection for communicating data.

In the illustrated embodiment, SP A 102 and SP B 107 can be active storage processors. Storage system 100 can include standby storage processors SP A' 170 and SP B' 175. SP A' 170 includes cache 172, and SP B' 175 includes cache 177. SP A' 170 and SP B' 175 can be any computing devices, such as servers, blade servers, etc. Cache 172 and cache 177 can be any memory. SP A' 170 and SP B' 175 are connected by service connection 180 and cache mirroring connection 182. Service connection 180 and cache mirroring connection 182 can each be any type of connection for communicating data between SP A' 170 and SP B' 175, such as an Ethernet connection, a PCI or PCI express connection, an infiniband connection, etc. In some embodiments, SP A' 170 and SP B' 175 are contained by storage processor enclosure 183. In some embodiments, service connection 180 and cache mirroring connection 182 can be located on a mid-plane or a back-plane in storage processor enclosure 183, into which SP A' 170 and SP B' 175 connect. SP A' 170 and SP B' 175 are connected to management network 150 by connection 194 and connection 196, respectively. SP A' 170 and SP B' 175 are connected to data networks 157 by connection 197 and connection 199, respectively.

SP A' 170 and SP B' 175 are connected to SP A 102 and SP B 107 by service connection 185. In some embodiments, SP B 107 includes a management module including an internal Ethernet switch to which service connections 185 and 112 are connected. Similarly, SP A' 170 can include an internal Ethernet switch to which service connections 185 and 180 are connected. In such embodiments, SP A 102 can communicate via service connection 112, to SP B 107, then through the switch in the management module in SP B 107, to reach SP A' 170 via service connection 185 (and can then communicate through the internal Ethernet switch in the management module in SP A' 170, to reach SP B' 175 via service connection 180). Beneficially, such a configuration permits each storage processor to communicate with each other storage processor over the service connections. SP A 102 and SP B' 175 are connected by cache mirroring connection 186, and SP B 107 and SP A' 170 are connected by cache mirroring connection 187. Service connection 185 and cache mirroring connections 186 and 187 can each be any type of connection for communicating data between SP A 102, SP B 107, SP A' 170, and/or SP B' 175, such as an Ethernet connection, a PCI or PCI express connection, an infiniband connection, etc. Service connection 185 and cache mirroring connections 186 and 187 can connect to backplanes, mid-planes, or IO cards in storage processor enclosure 116 and storage processor enclosure 183. For example, in some embodiments, service connections 112 and 180 can be located on a backplane and/or mid-pane in storage processor enclosure 116 and storage processor enclosure 183, respectively, and service connection 185 can be an external cable connecting storage processor enclosure 116 and storage processor enclosure 183. In some embodiments, cache mirroring connections 115 and 182 can be located on a backplane and/or mid-pane in storage processor enclosure 116 and storage processor enclosure 183, respectively. Cache mirroring connection 186 can be an external cable connecting SP A 102 and SP B' 175, and cache mirroring connection 187 can be an external cable connecting SP B 107 and SPA' 170.

It should be appreciated that storage system 100 in FIG. 1 is an exemplary storage system in accordance with the technology. Other configurations are contemplated. In some embodiments, the storage processors and disk enclosures can be in the same enclosure. In some embodiments, more than two storage processors can be in the same enclosure. As illustrated above, both SP A 102 and SP B 107 are connected to disk enclosure 117 (e.g., via connections 137 and 140, respectively) and connected to disk enclosure 127 (e.g., via connections 137 and 140, respectively, through disk enclosure 117). SP A' 170 and SP B' 175 are similarly connected to disk enclosure 127 and disk enclosure 117. In some embodiments, additional disk enclosures can be connected to active and standby storage processors (e.g., connected directly to each of the storage processors and/or connected to the storage processors by being connected through other disk enclosures). For example, multiple disk enclosures can be chained together as illustrated with respect to disk enclosure 122 and disk enclosure 132 (e.g., by connecting the LCC A in each of the disk enclosures in a chain, and connecting the LCC B in each disk enclosure in the chain). The active storage processors can be connected to the beginning of the disk enclosure chain (e.g., via the input ports of the first disk enclosure in the chain) and standby storage processors can be connected to the end of the disk enclosure chain (e.g., via the expansion ports of the last disk enclosure in the chain).

Storage System Operation

Figure 2A:
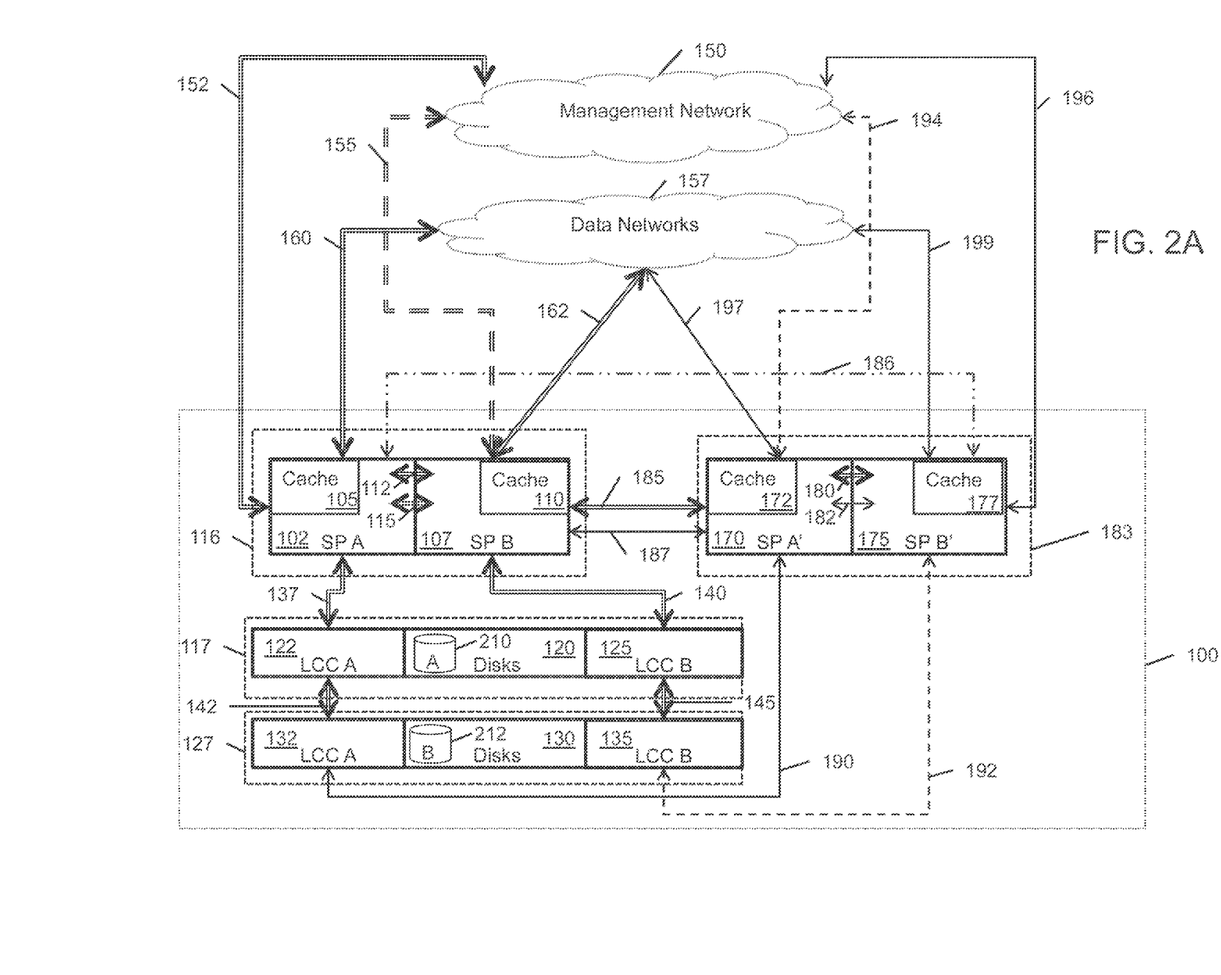
FIGS. 2A-2C depict a storage system in operation.
Figure 2B:
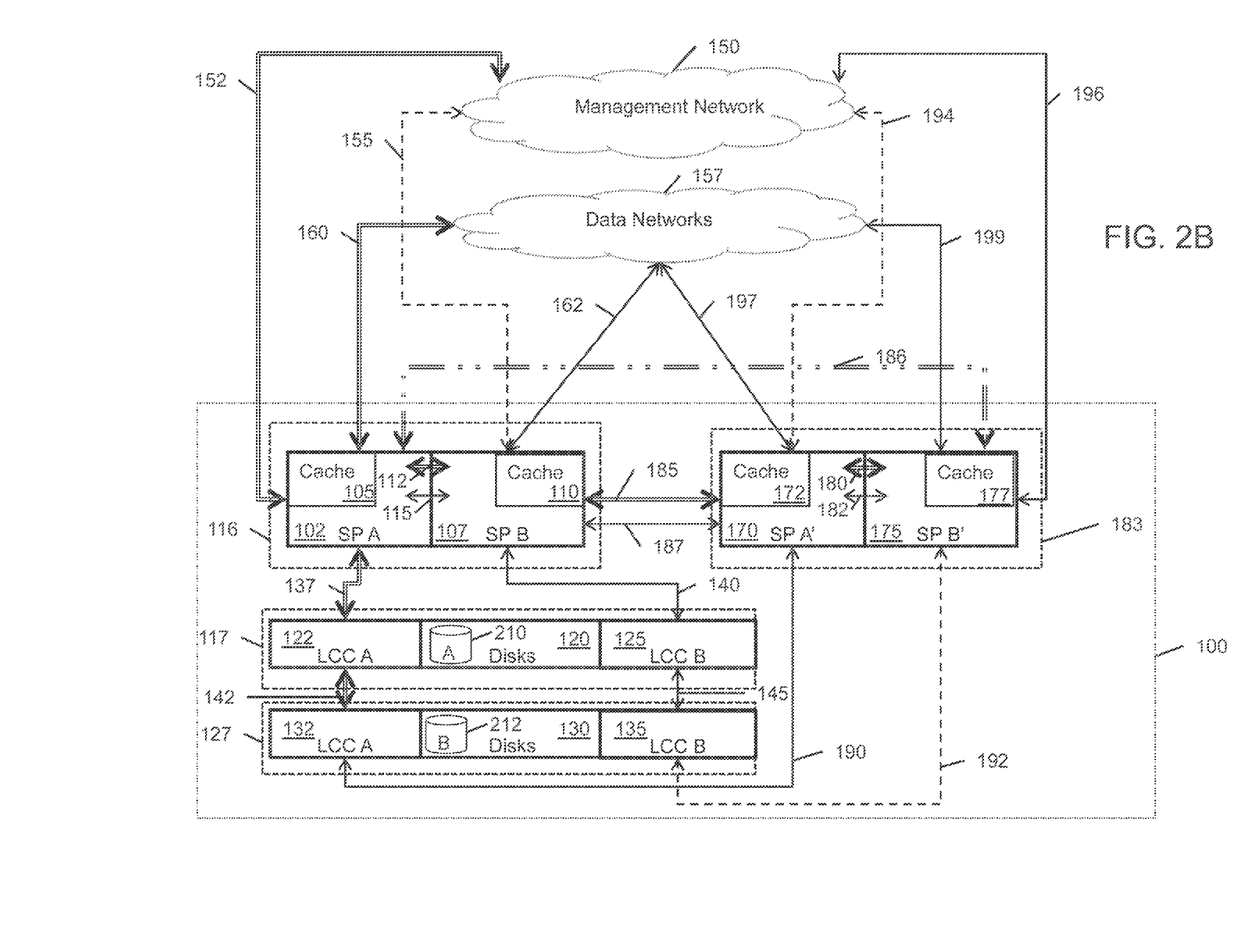
Figure 2C:
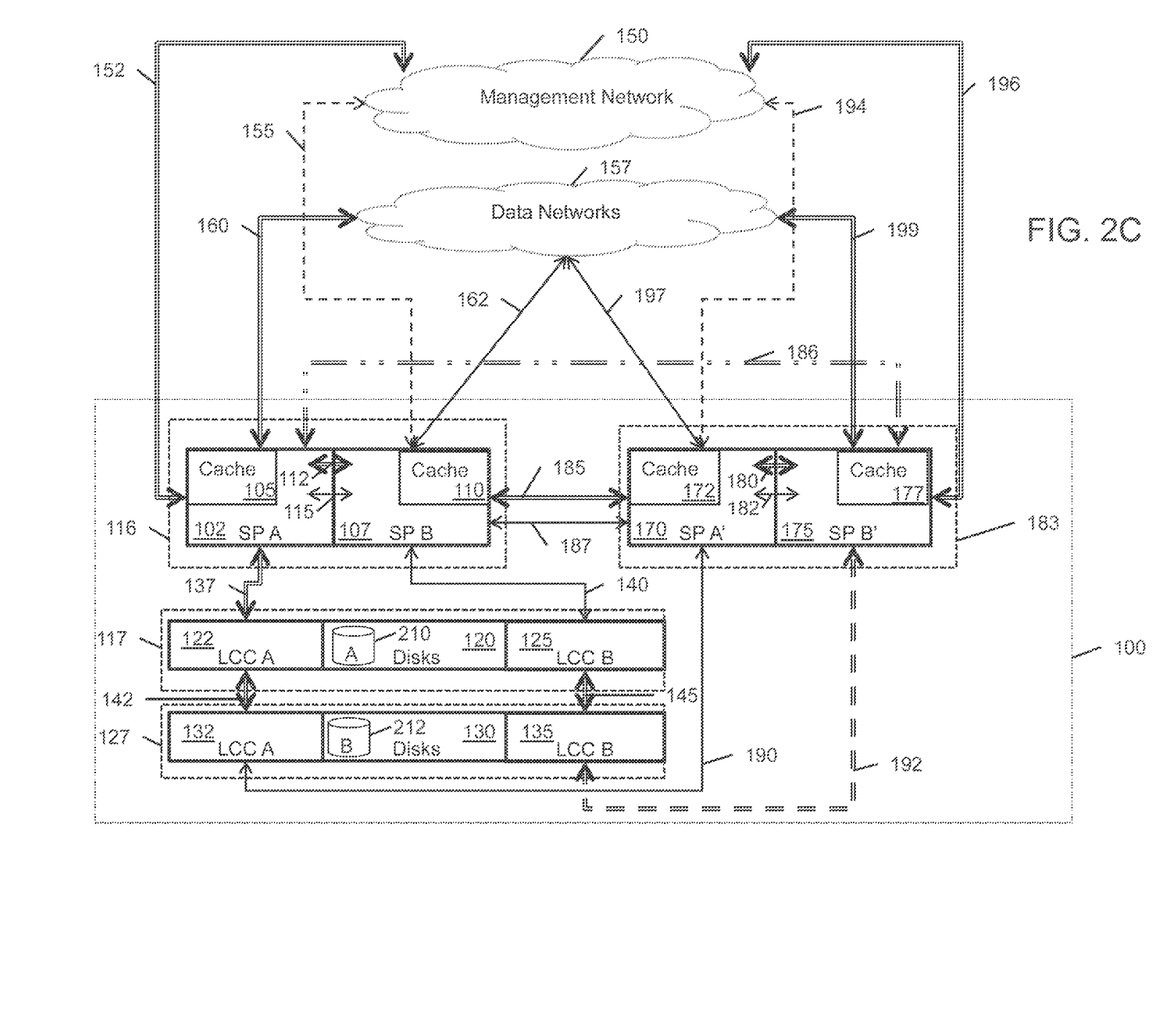

FIGS. 2A-2C depict storage system 100 in operation. As illustrated, storage system 100 includes LUN A 210 and LUN B 212. LUN A 210 is a logical storage volume consisting of portions of one or more of disks 120. LUN B 212 is a logical storage volume consisting of portions of one or more of disks 130. Storage system 100 can receive and process IO requests from hosts connected to data networks 157, where the IO requests indicate operations for (e.g., requests to read from or write to), e.g., LUN A 210 and LUN B 212.

With reference to FIGS. 2A-2C, connections depicted as heavy, double lines are in use or carrying data and connection depicted as light lines are physically present (e.g., cabled) but are not carrying data. FIG. 2A depicts storage system 100 when SP A 102 and SP B 107 are active. In general, SP A 102 and SP B 107 service IO requests received from data networks 157. When servicing the IO requests, caches 105 and 110 are mirrored (e.g., to ensure the data on storage system 100 appears identical to SP A 102 and SP B 107). SP A 102 and SP B 107 can also receive requests from management network 150 (e.g., to configure storage system 100 and/or provide information about the status of storage system 100).

In some embodiments, SP A 102 can effectuate IO requests on LUN A 210, and SP B 107 can effectuate IO requests on LUN B 212 (e.g., when SP A 102 owns LUN A 210, and SP B 107 owns LUN B 212). As an illustrative example, a host on data networks 157 can send a write IO request to write data to LUN B 212. If the host sends the write IO request to SP B 107, SP B 107 can perform the write request on LUN B 212. For example, SP B 107 can store the to-be-written data contained in the write IO request to cache 110 and/or write the to-be-written data to those of disks 130 making up LUN B 212. SP B 107 can update cache 105 on SP A 102 such that the contents of cache 105 and cache 110 both reflect that the write to LUN B 212 has occurred (e.g., via direct memory access over cache mirroring connection 115). SP B 107 can acknowledge to the sending host that the write IO request was performed. SP A 102 can receive IO requests for LUN B 212. If the host sends the write IO request to SP A 102 (e.g., via connection 160), SP A 102 will determine that SP B 107 performs IO requests on LUN B 212, and provide the write IO request to SP B 107. SP B 107 can effectuate the write IO request as described above and notify SP A 102 that the write IO request was performed. SP A 102 can acknowledge to the sending host that the write IO request was performed. IO requests for LUN A 210 can similarly be effectuated by SP A 102.

As illustrated in FIG. 2A, standby storage processors SP A' 170 and SP B' 175 are not active. For example, SP A' 170 and SP B' do not process IO or management requests (e.g., connections 194, 196, 197, and 199 are not in use). SP A' 170 and SP B' 175 can perform tasks. SP A' 170 and/or SP B' 175 can monitor SP A 102 and/or SP B 107 for failure. In some embodiments, SP A 102 and/or SP B 107 send heartbeat messages via service connection 185 to SP A' 170 and/or SP B' 175. If a heartbeat is not received within a pre-determined amount of time, SP A' 170 and/or SP B' 175 can determine that a failure has occurred. In some embodiments, SP A' 170 and/or SP B' 175 can poll SP A 102 and/or SP B 107 via service connection 185 for status. If SP A 102 and/or SP B 107 does not respond, SP A' 170 and/or SP B' 175 can determine that a failure has occurred. If a failure has occurred, storage system 100 can recover performance and availability as described with reference to FIGS. 2B-2C.

In some embodiments, cache 172 in SP A' 170 and cache 177 in SP B' 175 do not mirror cache 105 and 107 while SP A 102 and SP B 107 are active. In some embodiments, cache 172 in SP A' 170 and cache 177 in SP B' 175 mirror cache 105 and 107 while SP A 102 and SP B 107 are active (e.g., cache updates performed by SP A 102 and/or SP B 107 can be broadcast over cache mirroring connections 186 and 187).

FIG. 2B depicts storage system 100 after SP B 107 has failed. In response to SP B 107 failing, SP A 102 takes over servicing IO requests for LUN B 212 (and continues to service IO requests for LUN A 210). Connections to SP B 107 (e.g., connections 140, 155, and 162) are no longer in use. SP B' 175 begins starting an environment to service IO requests. In some embodiments, SP A 102 can copy the contents of cache 105 to cache 177 (e.g., via cache mirroring connection 186. FIG. 2C depicts storage system 100 after SP B' 175 has begun servicing IO. As illustrated, SP B' 175 has taken over processing IO requests for LUN B 212. Cache 105 and cache 177 can be mirrored via cache mirroring connection 186. In some embodiments, SP B' 175 can take over servicing IO requests for LUN B 212 directly after SP B 107 fails (e.g., SP A 102 continues to service IO requests for LUN A 210, but does not take over servicing 10 requests for LUN B 212). For example, in some embodiments, storage system 100 proceeds directly from the state shown in FIG. 2A to the state shown in FIG. 2C.

Figure 3:
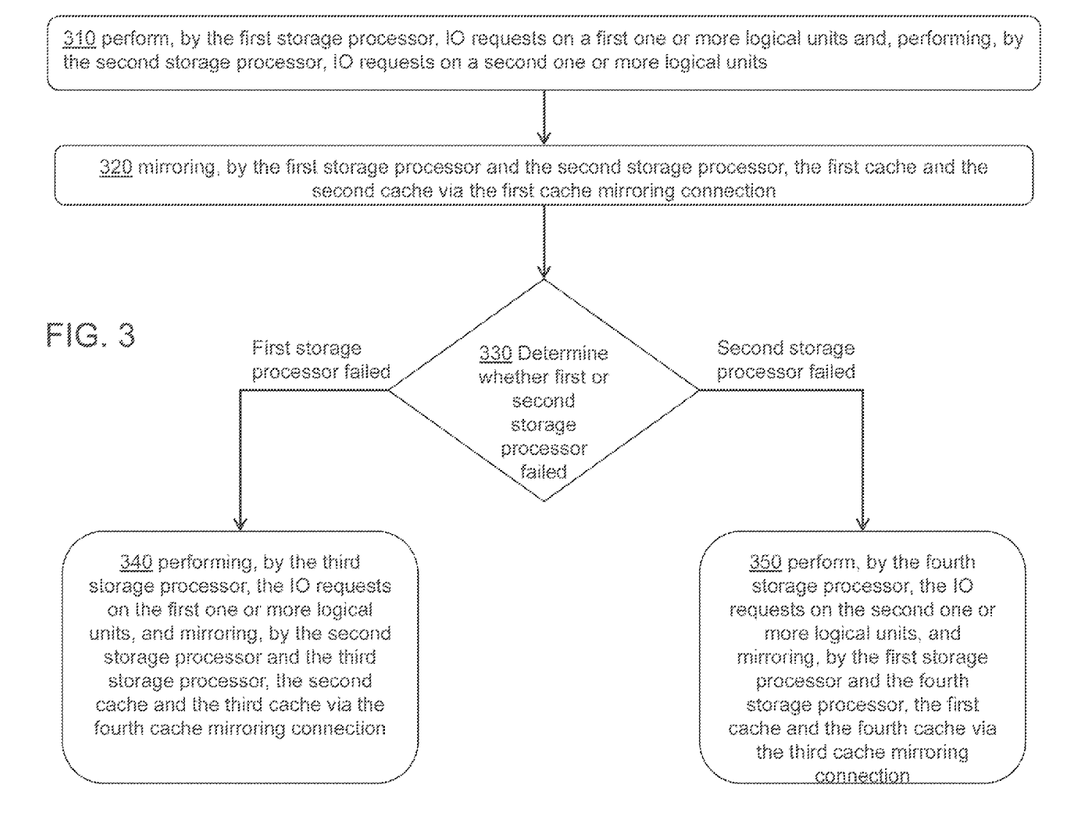
FIG. 3 is a flowchart depicting a method performed by a storage system in accordance with the technology.

FIG. 3 is a flowchart depicting a method performed by a storage system in accordance with the technology. At step 310, the first storage processor performs IO requests on a first one or more logical units and the second storage processor performs IO requests on a second one or more logical units. For example, as illustrated with respect to FIG. 2A, SP A 102 can perform IO requests on LUN A 210 and SP B 107 can perform IO requests on LUN B 212. At step 320, the first storage processor and the second storage processor mirror the first cache and the second cache. For example, as illustrated with respect to FIG. 1A, caches 105 and 110 are mirrored via cache mirroring connection 115. At step 330, it is determined whether the first or second storage processor has failed. If the first storage processor has failed, the method proceeds to step 340. If the second storage processor has failed, the method proceeds to step 350.

At step 340, the third storage processor performs the IO requests on the first one or more logical units, and the second storage processor and the third storage processor mirror the second cache and the third cache via the fourth cache mirroring connection. For example, with reference to storage system 100, in the event that SP A 102 fails, SP A' 170 can perform the IO requests for LUN A 210. Cache 110 of SP B 107 and cache 172 of SP A' 170 can be mirrored via cache mirroring connection 187.

At step 350, the fourth storage processor performs the IO requests on the second one or more logical units, and the first storage processor and the fourth storage processor mirror the first cache and the fourth cache via the third cache mirroring connection. For example, with reference to storage system 100, in the event that SP A 102 fails, SP A' 175 can perform the IO requests for LUN B 212. Cache 105 of SP A 102 and cache 177 of SP B' 175 can be mirrored via cache mirroring connection 186.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a storage system comprising a first storage processor enclosure comprising a first storage processor comprising a first cache, and a second storage processor comprising a second cache, the second storage processor connected to the first storage processor by a first cache mirroring connection; a second storage processor enclosure comprising a third storage processor comprising a third cache; and a fourth storage processor comprising a fourth cache, the fourth storage processor connected to the third storage processor by a second cache mirroring connection; wherein the first storage processor is connected to the fourth storage processor by a third cache mirroring connection, and the second storage processor is connected to the third storage processor by a fourth cache mirroring connection; and a disk enclosure comprising a plurality of disk units forming a plurality of logical units, wherein the disk enclosure is connected to the first storage processor, the second storage processor, the third storage processor, and the fourth storage processor, the method comprising:
- performing, by the first storage processor, input/output (IO) requests on a first one or more logical units of the plurality of logical units;
- performing, by the second storage processor, IO requests on a second one or more logical units of the plurality of logical units;
- mirroring, by the first storage processor and the second storage processor, the first cache and the second cache via the first cache mirroring connection;
- if the first storage processor fails, performing, by the third storage processor, the IO requests on the first one or more logical units, and mirroring, by the second storage processor and the third storage processor, the second cache and the third cache via the fourth cache mirroring connection; and
- if the second storage processor fails, performing, by the fourth storage processor, the IO requests on the second one or more logical units, and mirroring, by the first storage processor and the fourth storage processor, the first cache and the fourth cache via the third cache mirroring connection.

2. The method of claim 1, further comprising:
- if the first storage processor fails and the second storage processor fails:
  - performing, by the third storage processor, the IO requests on the first one or more logical units;
  - performing, by the fourth storage processor, the IO requests on the second one or more logical units; and
  - mirroring, by the third storage processor and the fourth storage processor, the third cache and the fourth cache via the second cache mirroring connection.

3. The method of claim 1, wherein the storage system further comprises a first service connection connecting the first storage processor and the second storage processor; a second service connection connecting the third storage processor and the fourth storage processor; and a third service connection connecting the first storage processor enclosure and the second storage processor enclosure, the method further comprising:
- monitoring for failure, by at least one of the first storage processor, the second storage processor, the third storage processor, and the fourth storage processor, via at least one of the first service connection, the second service connection, and the third service connection, at least one of the first storage processor, the second storage processor, the third storage processor, and the fourth storage processor.

4. The method of claim 1, further comprising, if the first storage processor fails, copying the second cache to the third cache before the third storage processor performs the JO requests on the first one or more logical units.

5. The method of claim 1, further comprising, if the second storage processor fails, copying the first cache to the fourth cache before the fourth storage processor performs the IO requests on the second one or more logical units.

6. The method of claim 1, further comprising mirroring the first cache, the second cache, the third cache, and the fourth cache via one or more of the first cache mirroring connection, the second cache mirroring connection, the third cache mirroring connection, and the fourth cache mirroring connection.

7. The method of claim 6, wherein mirroring the first cache, the second cache, the third cache, and the fourth cache via one or more of the first cache mirroring connection, the second cache mirroring connection, the third cache mirroring connection, and the fourth cache mirroring connection comprises broadcasting cache data via one or more of the first cache mirroring connection, the second cache mirroring connection, the third cache mirroring connection, and the fourth cache mirroring connection.

8. A storage system comprising:
- a first storage processor enclosure comprising:
- a first storage processor comprising a first cache; and
- a second storage processor comprising a second cache, the second storage processor connected to the first storage processor by a first cache mirroring connection;
- a second storage processor enclosure comprising:
- a third storage processor comprising a third cache; and
- a fourth storage processor comprising a fourth cache, the fourth storage processor connected to the third storage processor by a second cache mirroring connection;
- wherein the first storage processor is connected to the fourth storage processor by a third cache mirroring connection, and the second storage processor is connected to the third storage processor by a fourth cache mirroring connection;
- a disk enclosure comprising a plurality of disk units forming a plurality of logical units, wherein the disk enclosure is connected to the first storage processor, the second storage processor, the third storage processor, and the fourth storage processor;
- wherein the first storage processor is configured to perform input/output (IO) requests on a first one or more logical units of the plurality of logical units and the second storage processor is configured to perform IO requests on a second one or more logical units of the plurality of logical units, and the first storage processor and the second storage processor are configured to maintain the first cache and the second cache in a mirrored relationship via the first cache mirroring connection;
- wherein, if the first storage processor fails, the storage system is configured to cause the third storage processor to perform the IO requests on the first one or more logical units, and cause the second storage processor and the third storage processor to maintain the second cache and the third cache in a mirrored relationship via the fourth cache mirroring connection; and
- wherein, if the second storage processor fails, the storage system is configured to cause the fourth storage processor to perform the IO requests on the second one or more logical units, and cause the first storage processor and the fourth storage processor to maintain the first cache and the fourth cache in a mirrored relationship via the third cache mirroring connection.

9. The storage system of claim 8, wherein the storage system is further configured, if the first storage processor fails and the second storage processor fails, to cause the third storage processor to perform the IO requests on the first one or more logical units, the fourth storage processor to perform the IO requests on the second one or more logical units, and cause the third storage processor and the fourth storage processor to maintain the third cache and the fourth cache in a mirrored relationship via the second cache mirroring connection.

10. The storage system of claim 8, further comprising:
   a first service connection connecting the first storage processor and the second storage processor;
   a second service connection connecting the third storage processor and the fourth storage processor; and
   a third service connection connecting the first storage processor enclosure and the second storage processor enclosure;
   wherein at least one of the first storage processor, the second storage processor, the third storage processor, and the fourth storage processor is configured to monitor for failure at least one of the first storage processor, the second storage processor, the third storage processor, and the fourth storage processor via at least one of the first service connection, the second service connection, and the third service connection.

11. The storage system of claim 8, wherein, if the first storage processor fails, the storage system is further configured to copy the second cache to the third cache before causing the third storage processor to perform the IO requests on the first one or more logical units.

12. The storage system of claim 8, wherein, if the second storage processor fails, the storage system is further configured to copy the first cache to the fourth cache before causing the fourth storage processor to perform the IO requests on the second one or more logical units.

13. The storage system of claim 8, wherein, the storage system is further configured to maintain the first cache, the second cache, the third cache, and the fourth cache in a mirrored relationship via one or more of the first cache mirroring connection, the second cache mirroring connection, the third cache mirroring connection, and the fourth cache mirroring connection.

14. The storage system of claim 13, wherein the storage system is further configured to broadcast cache data via one or more of the first cache mirroring connection, the second cache mirroring connection, the third cache mirroring connection, and the fourth cache mirroring connection.

15. A storage system comprising:
   a first storage processor enclosure comprising:
   a first storage processor comprising a first cache; and
   a second storage processor comprising a second cache, the second storage processor connected to the first storage processor by a first cache mirroring connection;
   a second storage processor enclosure comprising:
   a third storage processor comprising a third cache;
   wherein the first storage processor, the second storage processor, and the third storage processor are connected by a second cache mirroring connection;
   a disk enclosure comprising a plurality of disk units forming a plurality of logical units, wherein the disk enclosure is connected to the first storage processor, the second storage processor, and the third storage processor;
   wherein the first storage processor is configured to perform input/output (IO) requests on a first one or more logical units of the plurality of logical units and the second storage processor is configured to perform IO requests on a second one or more logical units of the plurality of logical units, and the first storage processor and the second storage processor are configured to maintain the first cache and the second cache in a mirrored relationship via the first cache mirroring connection;
   wherein, if the first storage processor fails, the storage system is configured to cause the third storage processor to perform the IO requests on the first one or more logical units, and cause the second storage processor and the third storage processor to maintain the second cache and the third cache in a mirrored relationship via the second cache mirroring connection; and
   wherein, if the second storage processor fails, the storage system is configured to cause the third storage processor to perform the IO requests on the second one or more logical units, and cause the first storage processor and the third storage processor to maintain the first cache and the third cache in a mirrored relationship via the second cache mirroring connection.

16. The storage system of claim 15, further comprising:
   a first service connection connecting the first storage processor and the second storage processor;
   a second service connection connecting the first storage processor enclosure and the second storage processor enclosure;
   wherein the third storage processor is configured to monitor for failure at least one of the first storage processor and the second storage processor via at least one of the first service connection and the second service connection.

17. The storage system of claim 15, wherein, if the first storage processor fails, the storage system is further configured to copy the second cache to the third cache before causing the third storage processor to perform the IO requests on the first one or more logical units.

18. The storage system of claim 15, wherein, if the second storage processor fails, the storage system is further configured to copy the first cache to the third cache before causing the third storage processor to perform the IO requests on the second one or more logical units.

19. The storage system of claim 15, wherein, the storage system is further configured to maintain the first cache, the second cache, and the third cache in a mirrored relationship via one or more of the first cache mirroring connection and the second cache mirroring connection.

20. The storage system of claim 19, wherein the storage system is further configured to broadcast cache data via one or more of the first cache mirroring connection and the second cache mirroring connection.

* * * * *